US011093571B1

(12) United States Patent
Liu et al.

(10) Patent No.: US 11,093,571 B1
(45) Date of Patent: Aug. 17, 2021

(54) LINK LOCALIZATION BY COUNTRY

(71) Applicant: Pinterest, Inc., San Francisco, CA (US)

(72) Inventors: Fei Liu, San Francisco, CA (US); Jun Liu, San Francisco, CA (US); Siyang Xie, Mountain View, CA (US); Yang Xiao, Santa Clara, CA (US)

(73) Assignee: Pinterest, Inc., San Francisco, CA (US)

( * ) Notice: Subject to any disclaimer, the term of this patent is extended or adjusted under 35 U.S.C. 154(b) by 0 days.

(21) Appl. No.: 16/382,062

(22) Filed: Apr. 11, 2019

Related U.S. Application Data

(60) Provisional application No. 62/800,218, filed on Feb. 1, 2019.

(51) Int. Cl.
*G06F 16/909* (2019.01)
*G06F 16/955* (2019.01)
*H04L 29/08* (2006.01)
*G06F 16/9032* (2019.01)

(52) U.S. Cl.
CPC ........ *G06F 16/9566* (2019.01); *G06F 16/909* (2019.01); *G06F 16/90332* (2019.01); *H04L 67/02* (2013.01)

(58) Field of Classification Search
CPC .................................................. G06F 16/909
See application file for complete search history.

(56) References Cited

U.S. PATENT DOCUMENTS

| 8,938,670 | B2* | 1/2015 | Kolo | G06F 17/2863 |
| 9,098,582 | B1* | 8/2015 | Bass etal. | G06F 17/30864 |
| 2007/0214214 | A1* | 9/2007 | Kawakura et al. | G06F 15/173 |
| 2011/0231423 | A1* | 9/2011 | Lopiano | G06F 7/00 |
| 2013/0332400 | A1* | 12/2013 | Gonzalez | G06N 5/04 |

OTHER PUBLICATIONS

Agarap, A.F., 2018, Deep Learning using Rectified Linear Units (ReLU), http://arxiv.org/abs/1803.08375 7 pages, 11 figures, 9 tables.
Alspaugh, S., Chen, B.D., Lin, J., Ganapathi, A., Hearst, M.A. and Katz, R.H., 2014, Analyzing Log Analysis: An Empirical Study of User Log Mining. In LISA, Nicole Forsgren Velasquez (Ed.). USENIX Association, 53-68.

(Continued)

*Primary Examiner* — James J Debrow
(74) *Attorney, Agent, or Firm* — Athorus, PLLC

(57) ABSTRACT

Described are systems and methods that solve localization problems using Machine Learning models to compute country vectors for each linked content item and present content items in response to requests based on the country vectors. For example, a request from a user in Country A may be processed to determine candidate content items responsive to the request and to determine Country A as the country corresponding to the request. The candidate content items may then be processed to determine, for each candidate content item, a country vector corresponding to Country A as indicative of the relevance of the content item to Country A. Content items that are more likely than not to be relevant to the country of the request (e.g., Country A), as indicated by the respective country vector, may be considered as responsive and all other candidate content items discarded.

20 Claims, 7 Drawing Sheets

(56) References Cited

OTHER PUBLICATIONS

Bebis, G. and Georgiopoulos, M., 1994, Feed-forward Neural Networks.
Bieliauskaite, J. et al., Trustee—Data Privacy and Cloud Security Cluster Europe, ERCIM News Jul. 2018, No. 114, p. 37.
Chen, T. and Guestrin, C., 2016, XGBoost: A Scalable Tree Boosting System, in Proceedings of the 22nd ACM SIGKDD International Conference on Knowledge Discovery and Data Mining (KDD '16), ACM, New York, NY, USA, 785-794.
Davis, J. and Goadrich, M., 2006, The Relationship Between Precision-Recall and ROC Curves, in Proceedings of the 23rd International Conference on Machine Learning (ICML '06), ACM, New York, NY, USA, 233-240.
Ghandeharizadeh, S. and Muntz, R., 1998, Design and Implementation of Scalable Continuous Media Servers.
Goodfellow, I., Bengio, Y. and Courville, A., 2016, Deep Learning, MIT Press, http://www.deeplearningbook.org., 798 pages.
Hall, M.A., 1999, Correlation-based Feature Selection for Machine Learning, Ph.D. Dissertation.
He, S., Zhu, J., He, P. and Lyu, M.R., 2016, Experience Report: System Log Analysis for Anomaly Detection, in ISSRE, IEEE Computer Society, pp. 207-218.
Hecht, B.J. and Gergle,D., 2010, On the "Localness" of User-generated Content, in Proceedings of the 2010 ACM Conference on Computer Supported Cooperative Work (CSCW '10), ACM, New York, NY, USA, 229-232.
Huang, C. and Wang, D., 2016, Exploiting Spatial-Temporal-Social Constraints for Localness Inference Using Online Social Media, in ASONAM, Ravi Kumar, James Caverlee, and Hanghang Tong (Eds.). IEEE Computer Society, pp. 287-294.
Huang, C. and Wang, D., 2016, Topic-Aware Social Sensing with Arbitrary Source Dependency Graphs, in IPSN. IEEE, 7:1-7:12.
Kolmogorov, A.N., 1960, Foundations of the Theory of Probability (2 ed.), Chelsea Pub Co., http://www.clrc.rhul.ac.uk/resources/fop/Theory%20of%20Probability%20(small).pdf.
Linder, R., Snodgrass, C. and Kerne, A., 2014, Everyday Ideation: All of My Ideas are on Pinterest, in Proceedings of the SIGCHI Conference on Human Factors in Computing Systems (CHI '14), ACM, New York, NY, USA, pp. 2411-2420.
López, C. and Brusilovsky P., 2012, Towards Adaptive Recruitment and Engagement Mechanisms in Social Systems, Lecture Notes in Computer Science, vol. 7138. Springer Berlin / Heidelberg, Berlin, Heidelberg, Chapter 35, pp. 382-396.
Rennie, J.D.M., 2004, Derivation of the F-measure, URL: http://people.csail.mit.edu/jrennie/writing.
Shu, X., Smiy, J., Yao, D. and Lin, H., 2013, Massive Distributed and Parallel Log Analysis for Organizational Security. In GLOBECOM Workshops, IEEE, pp. 194-199.
Sundaresan, N., Yi, J. and Huang, A.W., 2000, Using Metadata to Enhance a Web Information Gathering System, in WebDB (Informal Proceedings), Dan Suciu and Gottfried Vossen (Eds.). pp. 11-16.
Tanaka, M., 2018, Weighted Sigmoid Gate Unit for an Activation Function of Deep Neural Network, CoRR abs/1810.01829.
Hosmer, D. and Lemeshow, S., 1989, Applied Logistic Regression, Interscience.
Witten, I.H. and Frank, E., 2005, Data Mining: Practical Machine Learning Tools and Techniques.

\* cited by examiner

LINK LOCALIZATION BY COUNTRY

PRIORITY CLAIM

This application claims priority to U.S. Provisional Patent Application No. 62/800,218, filed Feb. 1, 2019 and titled "Country Vector: Localization Based on Link, User, and Domain Information," the contents of which are incorporated herein by reference in their entirety.

BACKGROUND

As the world continues to become more and more connected, determining country origin or relevance for links, such as Uniform Resource Locators ("URLs"), is becoming more difficult and, yet, more important. For example, when a user enters a search for an item, the user is generally interested in results that are relevant to the user and/or the country in which the user is located. However, existing systems do not provide a good mechanism for associating links with one or more different countries of relevance.

DETAILED DESCRIPTION

Users in a social network often pin, share, link, search for, discover, etc., images, video, web pages, documents, audio, and/or other digital content items, referred to herein generally as content items. In a network based system, such as the Internet, those content items are generally associated with a link, such as a Uniform Resource Locator ("URL"), or other identifier that may be used to navigate to or otherwise access the content item. In our connected world, there is a need to determine the localness of a content item to a user or country so that relevant content items are presented to the user. Likewise, there are instances in which certain content items should not be returned to a particular user and/or to users in particular locations. For example, some content items may be considered offensive to users in particular countries but not offensive to other users in other countries.

As discussed herein, one or more "country vectors" are established for each linked content item. Each country vector is a vector of numbers between zero and one, indicating a relevance of the linked content item to that country. In some implementations, each country may be represented by a country vector and the country vector may indicate a level or degree of localness of the linked content item to the users in that country and used to determine whether to present a link to a content item to a user in that country. For example, if a user in Canada searches for a type of content item, the country vector for each candidate content item corresponding to the search may be determined and only links to content items having a country vector above a defined threshold (e.g., 0.7) are returned to the user.

Filtering content items by country vector provides a technical improvement over existing systems as it increases the relevance of presented information to the user by considering the country of the user and the country of relevance of the linked content item. Likewise, through the use of machine learning, country vectors may be generated for a large scale of content items and the localness of content items to one or more countries continually or periodically updated.

While the examples discussed herein refer to countries and country vectors, it will be appreciated that the disclosed implementations are equally applicable to other measures of location beyond country. For example, the disclosed implementations may be considered on a continent by continent perspective. Accordingly, countries as used herein shall be equally considered as any location and country vector may generally be referred to herein as a vector or location vector.

Figure 1:
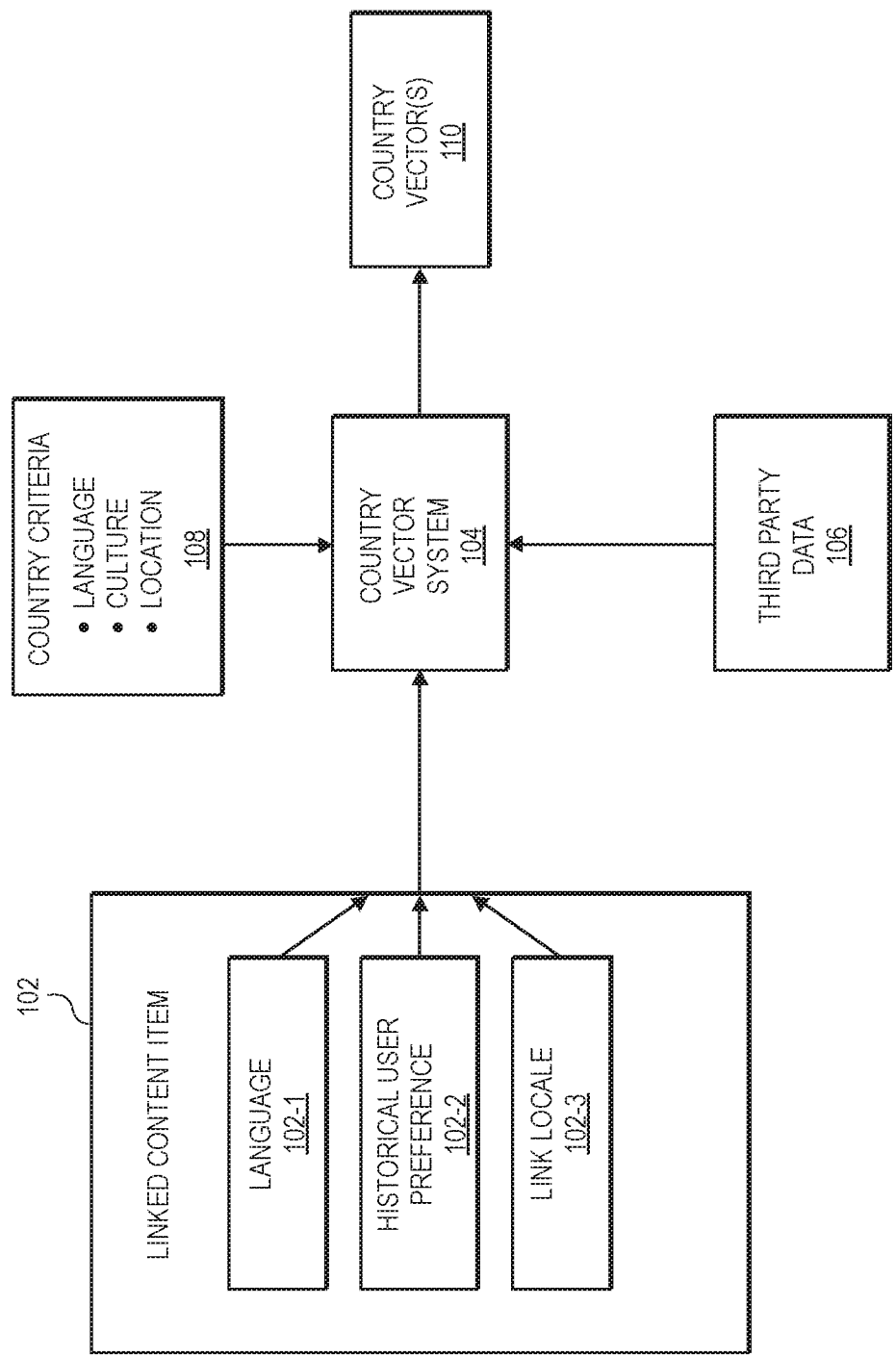
FIG. 1 illustrates an example block diagram of an environment that uses a machine learning system for determining one or more country vectors for a linked content item, in accordance with described implementations.

FIG. 1 illustrates an example block diagram of an environment that uses a machine learning system, referred to herein as a country vector system 104, to compute one or more country vectors for a linked content item 102, in accordance with described implementations. As illustrated, various inputs may be provided to the machine learning system 104 that are used to compute one or more country vectors 110 for a linked content item 102. For example, the link and/or the linked content item may be used to determine the language 102-1 of the content item, historical user preference for the linked content item 102-2, and/or the locale of the link 102-3. Likewise, in some implementations, third party information 106, such as domain scores corresponding to the linked content item may also be considered by the machine learning system 104 in computing country vector(s) 110 for the linked content item 102.

In addition, the country vector system 104 may utilize, during deployment and/or during training, one or more country criteria 108 corresponding to various countries for which country vectors are computed. For example, country criteria 108 for each country may include, but is not limited to, the language or languages spoken in that country, the culture, religions, etc., of that country, the government or type of government of the country, the physical location on earth of that country, etc. The country criteria may be provided by one or more users and/or holistically developed based on user behavior of users in those countries. For example, if users known to be located in Mexico view pages that have Spanish language, it may be determined that the language for that country is Spanish.

As discussed herein, the various inputs for a linked content item, such as the language 102-1, historical user preference 102-2, link locale 102-3, third party data 106, etc., may be utilized by the country vector system 104, along with the country criteria to generate one or more country vectors for that linked content item. In some implementations, country vectors for a content item may be generated, associated with the linked content item 102 and maintained in a data store such that the country vectors are available for consideration each time a link to the content item may be presented to a user. In other implementations, the machine learning system may compute country vectors for a content item on an as-needed or ad-hoc basis. For example, if a user submits a query, the disclosed implementations may determine candidate content items responsive to the query, country vectors relevant to the country or user computed for each candidate content item, and results filtered based on those computed country vectors.

As discussed further below, the language 102-1 of a linked content item may be determined by processing the link and/or content item using one or more language processing systems, which are known in the art, to determine the native language or languages included in the link or the linked content item.

As discussed further below, the historical user preference 102-2 of a linked content item indicates the historical visits by prior users and the location of those prior users during the historical visits. For example, users may provide and/or maintain a user profile that indicates a user location of the user. In other examples, metadata about a user, such as the IP address. Wi-Fi information, Global Positioning System (GPS) data, etc., may also be determined for prior users and utilized to determine the location of the prior user during the historical visits. In some implementations, the location of the prior users may be aggregated and anonymized to ensure privacy and used as the historical user preference 102-2 for a linked content item.

As discussed further below, the link locale 102-3 may be determined based on additional information about the linked content item. For example, the link locale may be determined based on metadata indicating how the content item is to be rendered, the name or title of the content item, the domain of the content item, etc.

As discussed further below, third party data 106 may include, but is not limited to third party domain scores, such as those provided by ALEXA INTERNET, INC. In such instances, the location or domain scores may be computed based on, for example, the domain part (e.g., .com, .de, .jp), etc., and/or based on background information about the domain, the content item, and/or users that visit the content item.

The machine learning system used with the disclosed implementations may utilize any one or more of a Logistic Regression model, a Gradient Boosted Tree model, and/or a Feed-Forward Neural Network. To train the machine learning model, in some implementations, a training set of data is established by manually indicating the country or countries with which each linked content item in the training data corresponds that is provided to the machine learning system along with the language 102-1, historical user preference 102-2, link locale 102-3, and third party data 106 for each linked content item of the training data. Likewise, the country criteria 108, such as the language, culture, religions, location, etc., of each country for which a country vector may be produced may also be provided as the training input to the machine learning model. The trained model may then utilize one or more of the language 102-1, historical user preference 102-2, link locale 102-3 and/or third party data 106 of an input linked candidate item 102 to compute country vectors for that linked content item.

Figure 2:
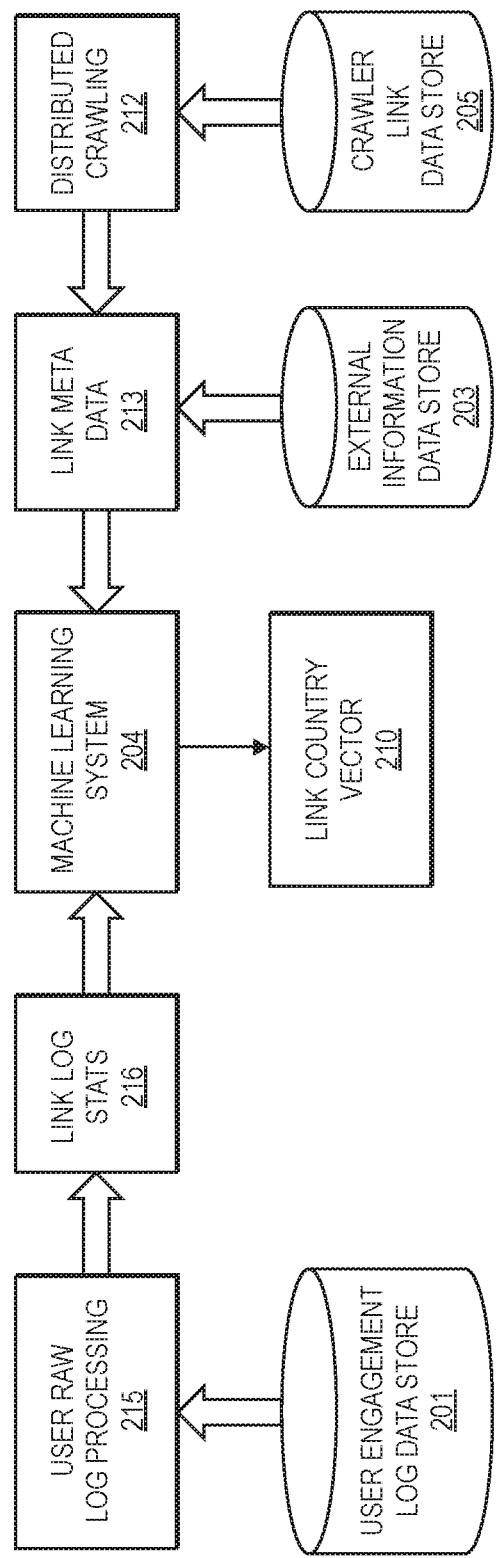
FIG. 2 illustrates a data processing workflow overview, in accordance with described implementations.

FIG. 2 illustrates a data processing workflow overview, in accordance with described implementations. To generate the features or inputs that are considered by the machine learning system to compute the country vector, a content item crawler 212 may periodically crawl content items to determine information about those content items. The content items may be any items that are accessible by the system. In one example, the content items may include content items accessible through a crawler link data store 205 that maintains a list or links to various content items. As the crawler processes content items it may generate link meta data 213 about the linked content items. The link meta data 213 may include, but is not limited to, the locale of the content item, the title or name of the content item, a description of the content item, etc. The link meta data 213 may also be supplemented with third party or external data accessible through an external information data store 203. As discussed above, third party data may include, but is not limited to, domain locale data, user access history, meta data or tracking about the linked content item, etc.

Figure 3:
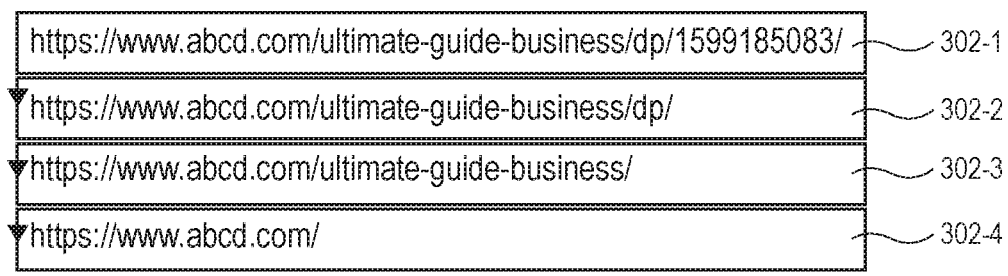
FIG. 3 illustrates an example block diagram of link retraction to increase coverage, in accordance with described implementations.

In some implementations, the link itself may be processed by retracting the link path to determine location or country relevant information from the link, as illustrated in FIG. 3, in accordance with described implementations. For example, the link https://ww.abcd.com-ultimate-guide-businessdp/1599185083 302-1 may only provide limited information about the locale or country relevant to the link. However, at each level of regression, such as https.// www.abCd.com/ultimate-guide-business/dp 302-2, https// www.abcd.com/ultimate-guide-business/ 302-3, and https:// www abcd.com/ 302-4, each provide different levels of detail about the particular country or locale of the link. For example, www.ABCD.com and www.ABCD.de are highly likely to be different in country vector because a large proportion of the visitors to www.ABCD.de are from Germany and in fact the language is German, too. In comparison, www ABCD.com will highly correspond to the United States and other English speaking countries.

In addition, by processing links at different levels of regression, information from one link level may be utilized to provide information for other linked content items that share the same link level. For example, if information for links at the link level www.ABCD.com is available, that information can be utilized as inputs in determining the country vector for linked content items www ABCD.com/ ultimate-guide-business as well as other linked content items that share the same link level, such as www.ABCD com/ shoe-for-fashion. Such information may be necessary because not all links include metadata sufficient to determine country vectors in a reliable manner.

In addition, in some implementations, user raw log processing 215 may be performed to provide information relating to user activity and that processing may generate link log statistics 216 that are provided to the machine learning system 204. For example, as users interact or engage with content, those user activities may be maintained in a user engagement log datastore 201. The system may then periodically, or continually, process the raw user logs to add information known about the users, including but not limited to, the location of the user, the user device type, user preferences, etc. The processed user logs may then be aggregated to produce link log statistics 216 that are indicative of overall user behavior for different content and/or different types of users at different locations.

Returning to FIG. 1, the machine learning system 104 may utilize the language 102-1 determined for a linked content item as an input in determining the country vector for that linked content item 102. For example, the language determined for a linked content item 102 may be reverse mapped to a list of countries that speak the determined language. Then, after the language of the content item is detected and/or based on the retraction of the link, as discussed with respect to FIG. 3, the language can be used to determine the countries for which a country vector is to be computed. This may be done to limit the number of computations and/or country vectors computed for a linked content item, thereby improving the efficiency of the system and the accuracy of results.

For example, the countries for which a country vector is to be computed for a linked content item may be determined as:

$$I_{i,j} = \begin{cases} 1, & \text{if link } i \text{ uses language } j. \\ 0, & \text{otherwise.} \end{cases}$$

$$C_{z,j} = \begin{cases} 1, & \text{if country } z \text{ uses language } j. \\ 0, & \text{otherwise.} \end{cases}$$

In which subscript j means the $j^{th}$ language in all language set L, subscript i means the $i^{th}$ link in all link set I, and subscript z means the $z^{th}$ country in all country set C, subscript j means the $j^{th}$ language in all language set L.

Utilizing the above, language matching may be done between $i^{th}$ link in L and $z^{th}$ country in C as:

$$languageMatch_{i,z} = \sum_{j \in L} I_{ij} * C_{zj}$$

As noted above, historical user preference 102-2 may also be computed and used as an input to determine a country vector for a linked content item. To compute the historical user preference for a content item it is determined for user u∈U, where U is set of all users; from a country z∈C, where C is set of all countries, at time t∈T, where, T={t|T−30<t<T} and T is the date of workflow execution; took an action a∈A, where A is all actions that an user can take; on a link jinL, where L is all link set, a binary variable may be defined as:

$$P_{u,z,t,a,j} = \begin{cases} 1, & \text{if the above case happen.} \\ 0, & \text{otherwise.} \end{cases}$$

For each country, a series of statistics that relate to the different actions that may be performed with respect to the linked content item may be defined. For example, an impression statistic may be defined from a country z∈C, where C is set of all countries; for an action a=Impression, where Impression is counted as a view of the content item of a link j∈C, where L is all links of a set:

$$Imp_{z,j} = \sum_{\substack{u \in U \\ t \in T \\ a=Imp}} P_{u,z,t,a,j}$$

As another example, e a click statistic may be defined from a country z∈C, where C is set of all countries; for an action a=Click, where Click is counted as a selection of the linked content item of a link j∈L, where L is all links of a set:

$$Click_{z,j} = \sum_{\substack{u \in U \\ t \in T \\ a=Click}} P_{u,z,t,a,j}$$

As still another example, a share statistic may be defined from a country z∈C, where C is set of all countries; for an action a=Share, where Share is counted as a share of the linked content item of a link j∈L, where L is all links of the set:

$$Share_{z,j} = \sum_{\substack{u \in U \\ t \in T \\ a=Share}} P_{u,z,t,a,j}$$

As still another example, a create statistic may be established from a country z∈C, where C is set of all countries; for an action a=Create, where a second content item was created from a linked content item of link j∈L, where L is all link set, statistics can be defined as:

$$Create_{z,j} = \sum_{\substack{u \in U \\ t \in T \\ a=Create}} P_{u,z,t,a,j}$$

For link retraction, the link retraction for link path to upper level as separated by '\' with a function may be expressed as:

$$Prefix(j) = \begin{cases} i, & \text{if } i \text{ is one level up in url.} \\ j, & \text{there is no level up} \end{cases}$$

The retraction mechanism may then be formulated as a recursive function:

$$F(stats, z, j) = \begin{cases} stats_{z,j}, & \text{if } stats_{z,j} > 0. \\ stats_{z,prefix(j)}, & \text{if } stats_{z,j} = 0, prefix(j) \neq j \\ 0, & \text{otherwise.} \end{cases}$$

Utilizing the recursive functions, the statistics may be aggregated into one heuristic called Perf.

$$Perf_{z,j} = \\ F(Click, z, j) + F(Repin, z, j) + F(Create, z, j) + \log\frac{F(Imp, z, j)}{1000}$$

In some implementations, this heuristic is defined because user actions such as click, share, and create are rare. The majority of historical user impressions of a content item are the result of a search in which the user knows their intention. However, this is only a popularity score. The country the traffic is coming from may also be considered to get a sense of country preference. To determine country preference, the statistics may be aggregated into one heuristic called Perf which provides the historical user preference for the linked content item:

$$CountryPerf_{z,j} = \frac{Perf_{z,j}}{\sum_{z \in C} Perf_{z,j}}$$

As discussed above, domain information may also be used as an input in determining country vector scores for a linked content item. For example, suppose the likelihood of the situation where a user from $c \in C$, where C is set of all countries, was exposed to link $j \in L$, where L is set of all links, and takes an action $a \in A$, where A is set of all actions is:

$$P(a \mid c, j) = \frac{P(a, c \mid j)}{\sum_{a \in A} P(c \mid a, j) * P(a \mid a, j)} \propto P(c \mid a, j)$$

A Bayesian algorithm may be used to say that given a country and a link, the likelihood to take action is proportional to the likelihood of a link coming from a certain country given the action on the link. Given an action type for link j, which country the link comes from can be estimated through user action given the link and the country of that link, so Pc|a, j may be approximated by calculating the average of P(a|c, j). Then $$P(c \mid a, j) \propto EP(a \mid c, j)$$

Because if the action the user would perform upon seeing the domain is to be determined, in some implementations, an assumption may be made that the domain part of a link is the only factor that causes a user to take an action and the user infers the country of the link from the domain.

$$P(a \mid c, j) = P(a \mid c, d) P(c \mid d) P(d \mid j) = P(a \mid c, d) P(c \mid d)$$

Because human perception does not change drastically over a short period of time (e.g., overnight), it may be assumed that P(c|d) is fixed and further assume that P(a) is fixed. Based on those assumptions:

$$P(c \mid j) = \sum_a P(a \mid c, j) * P(a) \propto \sum_a P(a \mid c, j) = \sum_a P(a \mid c, d)$$

This may be further simplified by logging a user visit as binary variable:

$$Visit_{a \mid c,d} = \begin{cases} 1, & \text{if a user in country } c \text{ would act on seeing domain } j. \\ 0, & \text{otherwise.} \end{cases}$$

Logging the user visit as a binary variable provides:

$$P(c \mid j) = \frac{1}{N-1} * \sum_{a \in A} Visit_{a \mid c,d}$$

Based on the above, it can be determined what proportion of traffic comes from a certain country to a certain domain of a link to infer the likelihood that the link is local to a certain country.

Utilizing the above, the machine learning system utilizes one or more of the determined language 102-1, historical user preference 102-2, link locale 102-3, and optionally third party data, to determine the countries for which a country vector is to be computed and to compute a country vector for the linked content item for each of those countries.

Utilizing the computed country vectors, linked content items can be ranked, filtered, etc., to improve the relevance and accuracy of linked content items presented to a user.

Figure 4:
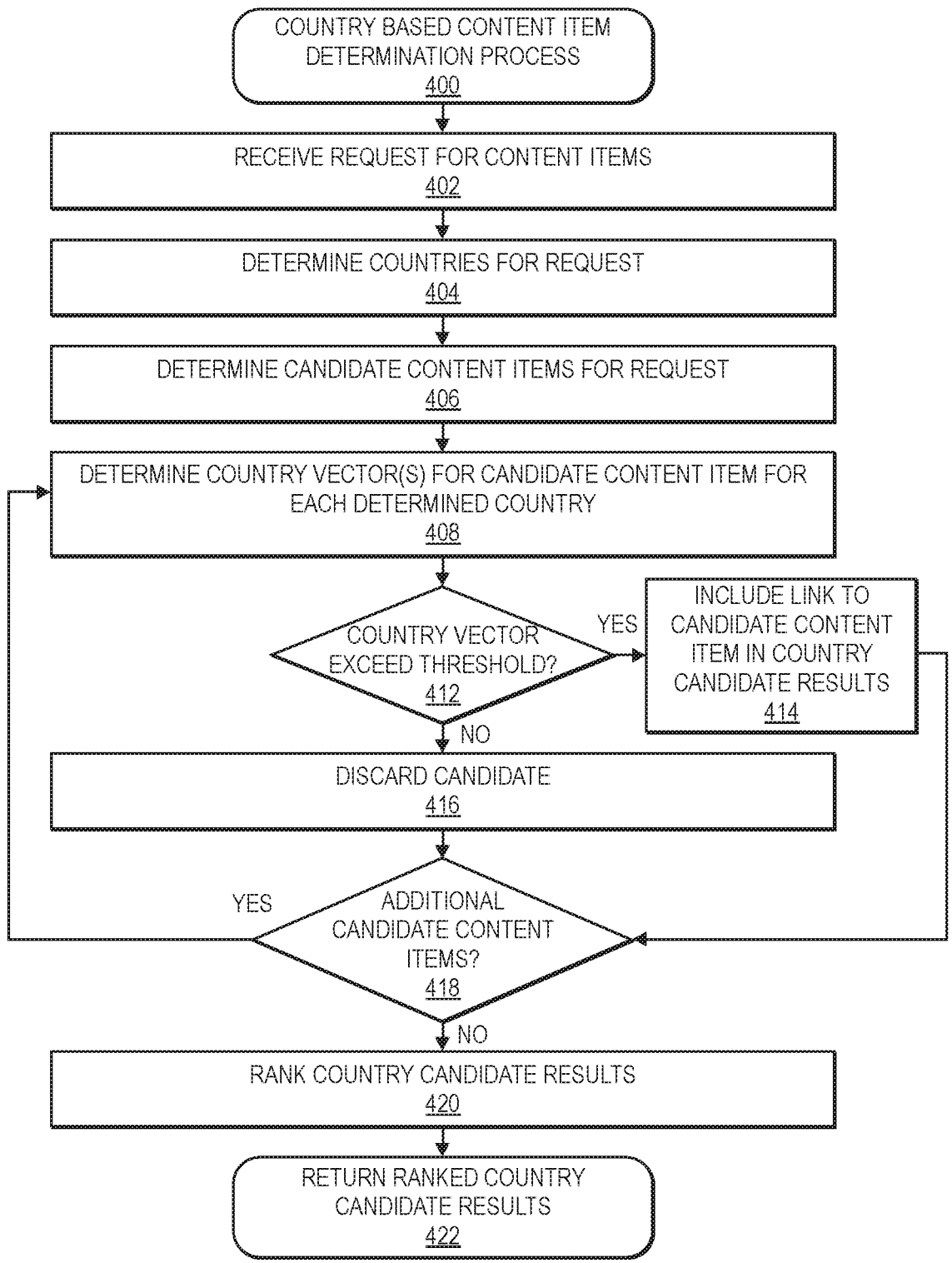
FIG. 4 is a flow diagram of an example country based content item determination process, in accordance with described implementations.

FIG. 4 is a flow diagram of an example country based content item determination process 400, in accordance with described implementations.

The example process 400 begins upon receipt of a request for one or more content items, as in 402. The request may be, for example, a specific search query input by a user, a request from an application for content to present to the user (with or without a specific request for a search from the user), etc. In general, the content item request in block 402 is any request for one or more linked content items that are to be presented to a user.

Upon receiving the request for content items, one or more countries corresponding to the request are determined, as in 404. For example, if the user submitting the request to whom the results are to be presented is known, the user profile associated with the user may be queried to determine the country of the user. In other examples, the language of the application submitting the request, the IP address of the device submitting the request, the GPS location of the device submitting the request, and/or other information may be utilized to determine the country corresponding to the request. In some implementations, more than one country may be determined to correspond with the request. For example, the user may indicate in their user profile multiple countries from which linked content items may be presented. As another example, it may be determined over a period of time that a user travels between multiple different countries and that content items from some or all of those multiple countries may be responsive to the request.

In addition to determining the countries corresponding to the request, one or more candidate content items responsive to the request are determined, as in 406. The candidate content items may be determined independent of the country or countries determined for the request. As such, in an Internet based search, the candidate search results may be from any country or any location.

For each candidate search result, a country vector for each determined country corresponding to the request is computed, as discussed above, as in 408. As country vectors for a candidate content item are computed, a determination is made as to whether one or more of the country vectors for that content item exceeds a threshold, as in 412. The threshold may be any defined amount or indicator against which the country vector values may be compared. For example, if the country vectors range between 0.0 and 1.0, the threshold may be any value between 0.0 and 1.0, such as 0.7.

If it is determined that one or more computed country vectors for a candidate content item exceeds the threshold, the link to that content item is included in the country candidate results list, as in 414. If it is determined that one or more of the country vectors for the candidate content item does not exceed the threshold, the content item is discarded from consideration, as in 416.

A determination is then made as to whether there are additional candidate content items for which one or more country vectors are to be computed, as in 418. If there are additional candidate content items, the example process 400 returns to block 408 and continues.

Once all candidate content items have been processed and either included in the country candidate list or discarded, the content items included in the country candidate results are ranked, as in 420. Ranking may be done using any of a variety of techniques and factors. In one implementation, the country candidate results are ranked based on both the country vectors and a determined relevance to the request. In other implementations, the country candidate results may be ranked solely based on the country vectors, solely based on the relevance to the request, or based on a weighted average between the country vectors and the relevance to the request.

Finally, a top portion or all of the ranked country candidate results are provided as links to the respective content items for presentation in response to the request, as in 422. For example, the links to the content items may be presented to a user in response to a search request.

Figure 5:
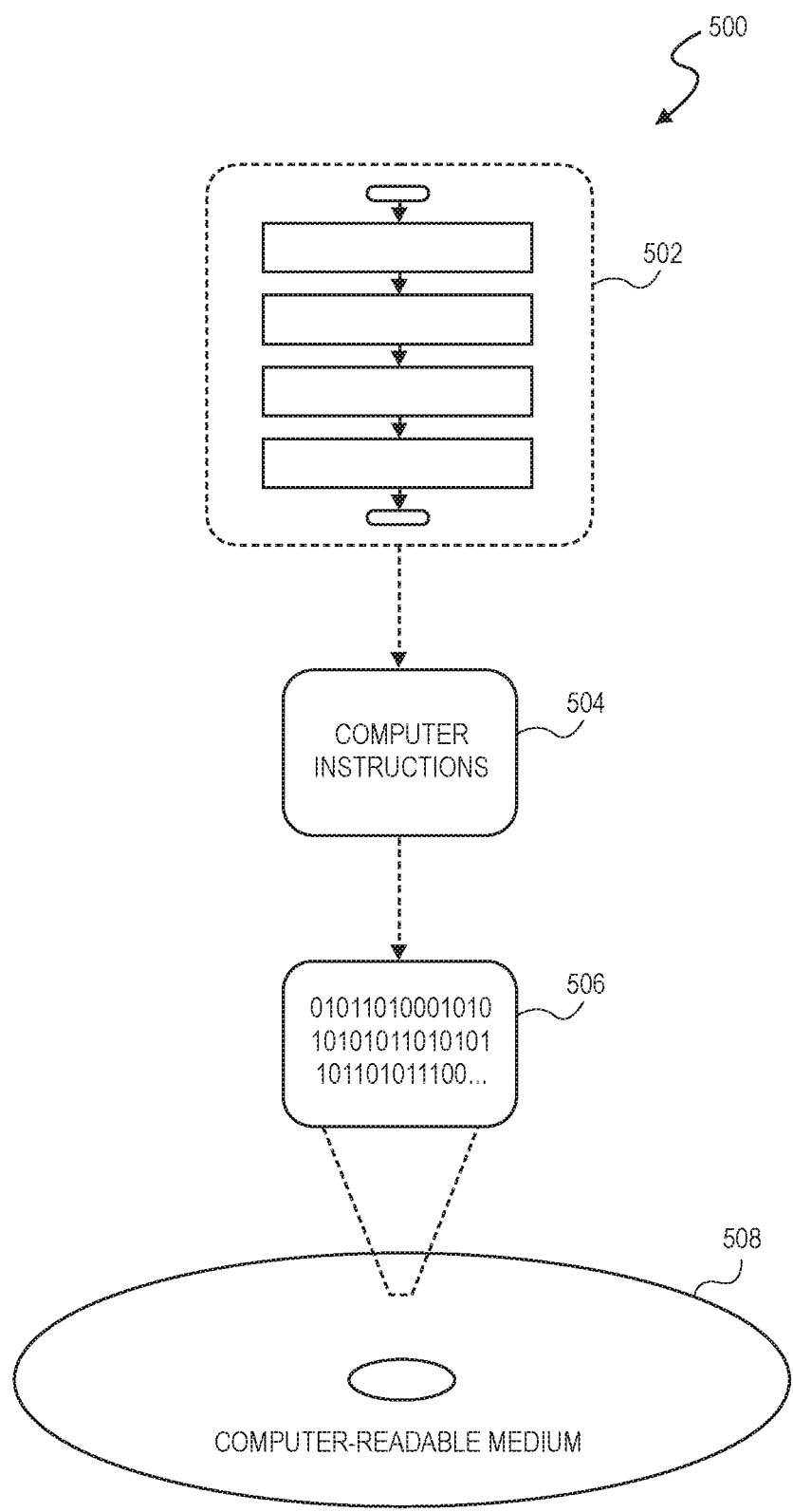
FIG. 5 is a block diagram illustrating an exemplary computer readable medium encoded with instructions for computing country vectors and determining country candidate results, in accordance with described implementations.

FIG. 5 is a block diagram illustrating an exemplary computer readable medium encoded with instructions for computing country vectors and determining country candidate content items, in accordance with described implementations. More particularly, the implementation 500 comprises a computer-readable medium 508 (e.g., a CD-R, DVD-R or a platter of a hard disk drive), on which is encoded computer-readable data 506. This computer-readable data 506 in turn comprises a set of computer instructions 504 configured to operate according to one or more of the principles set forth herein. In one such implementation 502, the processor-executable instructions 504 may be configured to perform a method, such as at least some of exemplary routines 400. In another such implementation, the processor-executable instructions 504 may be configured to implement a system on a computing device, such as at least some of the exemplary, executable components of computing device 600 of FIG. 6, as described below. Many such computer readable media may be devised, by those of ordinary skill in the art, which are configured to operate in accordance with the techniques presented herein.

Figure 6:
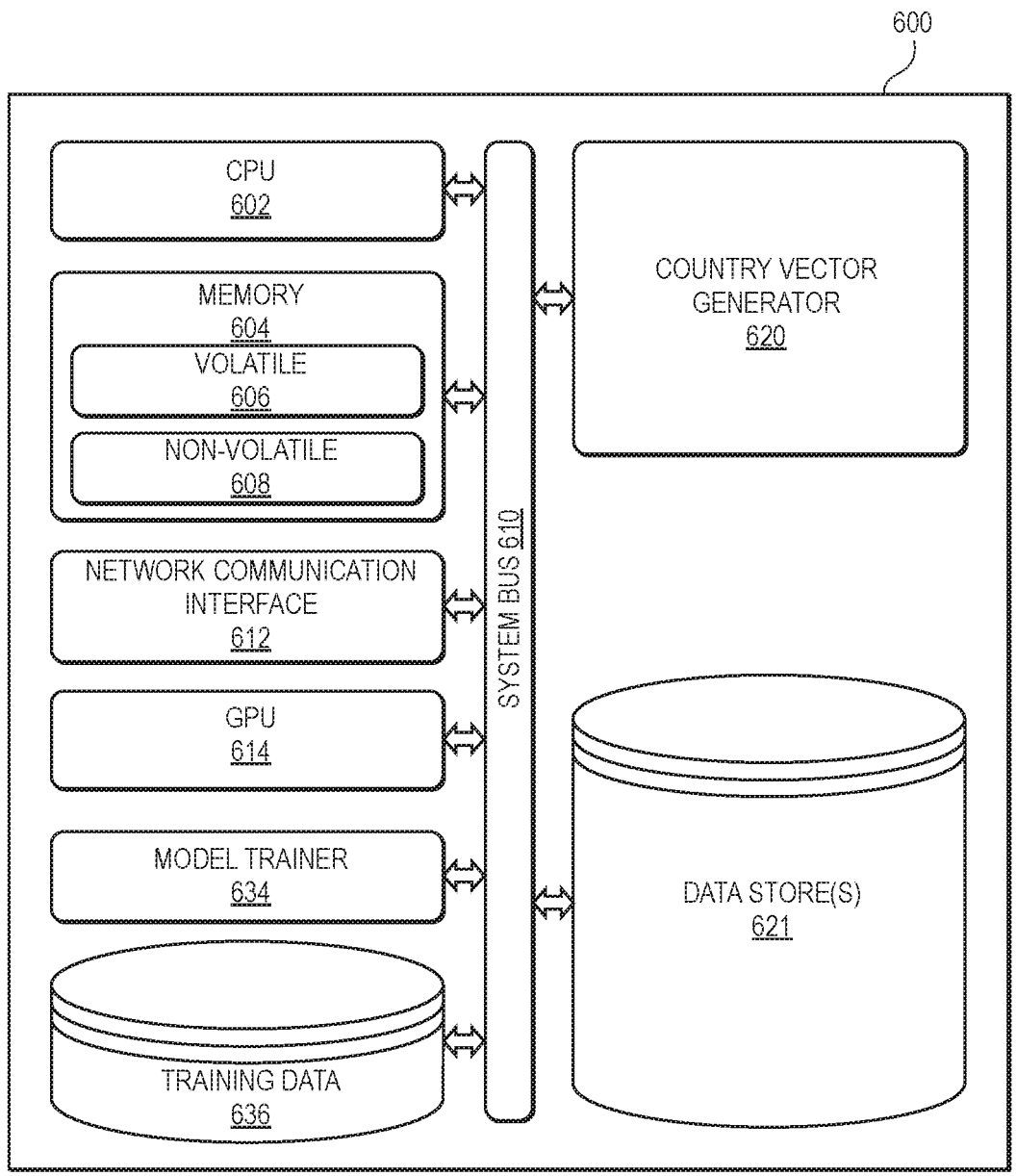
FIG. 6 is a block diagram illustrating an exemplary computing system (or computing device) suitably configured for implementing a machine learning system and/or computing country vectors, in accordance with described implementations.

Turning now to FIG. 6, FIG. 6 is a block diagram illustrating an exemplary computing system 600 (or computing device) suitably configured for implementing a machine learning system and/or to compute country vectors and/or determine country candidate content items, in accordance with described implementations. The computing system 600 typically includes one or more central processing units (or CPUs), such as CPU 602, and further includes at least one memory 604. The CPU 602 and memory 604, as well as other components of the computing system, are interconnected by way of a system bus 610.

As will be appreciated by those skilled in the art, the memory 604 typically (but not always) comprises both volatile memory 606 and non-volatile memory 608. Volatile memory 606 retains or stores information so long as the memory is supplied with power. In contrast, non-volatile memory 608 is capable of storing (or persisting) information even when a power supply is not available. Generally speaking, RAM and CPU cache memory are examples of volatile memory 606 whereas ROM, solid-state memory devices, memory storage devices, and/or memory cards are examples of non-volatile memory 608.

As will be further appreciated by those skilled in the art, the CPU 602 executes instructions retrieved from the memory 604, from computer readable media, such as computer readable media 508 of FIG. 5, and/or other executable components in carrying out the various functions of recommending likely digital content items for a content collection. The CPU 602 may be comprised of any of a number of available processors such as single-processor, multi-processor, single-core units, and multi-core units, which are well known in the art.

Further still, the illustrated computing system 600 typically also includes a network communication interface 612 for interconnecting this computing system with other devices, computers and/or services over a computer network, such as the Internet. The network communication interface 612, sometimes referred to as a network interface card or NIC, communicates over a network using one or more communication protocols via a physical/tangible (e.g., wired, optical fiber, etc.) connection, a wireless connection such as Wi-Fi or Bluetooth communication protocols, NFC, or a combination thereof. As will be readily appreciated by those skilled in the art, a network communication interface, such as network communication component 612, is typically comprised of hardware and/or firmware components (and may also include or comprise executable software components) that transmit and receive digital and/or analog signals over a transmission medium (i.e., the network).

The illustrated computing system 600 also includes a graphics processing unit (GPU) 614. As those skilled in the art will appreciate, a GPU is a specialized processing circuit designed to rapidly manipulate and alter memory. Initially designed to accelerate the creation of images in a frame buffer for output to a display, due to their ability to manipulate and process large quantities of memory, GPUs are advantageously applied convolution processes of a machine learning model/neural network that manipulate large amounts of data, as described above. Indeed, one or more GPUs, such as GPU 614, are viewed as essential processing components when conducting machine learning technique. Also, and according to various implementations, while GPUs are often included in computing systems and available for processing convolutions of machine learning models, such as GPU 614 of computing system 600, multiple GPUs are also often deployed as online GPU services or farms and machine learning processing are advantageously directed to conducting the various layers/convolutions of a neural network as described in regard to the exemplary network environment 700 of FIG. 7.

The computing system 600 further includes an executable country vector generator component 620. In execution on the computing system 600, the country vector generator component 620 operates in a similar manner to that described herein. Indeed, the country vector generator component 620 receives the herein described inputs for a content item (e.g., locale, language, historical user preference) and computes one or more country vectors for the content item.

As mentioned above, machine learning models comprising multiple layers of processing are best performed by GPUs, such as GPU 614, rather than central processing units (CPUs), such as CPU 602. Indeed, GPUs are specifically designed to manipulate large amounts of memory and perform floating point operations on a faster and larger scale than are CPUs. This is significant when processing large data sets comprising data-rich items of content, such as images. Indeed, the abilities of the GPU allow the machine learning models to solve linear algebra equations, conduct statistical analysis, regressions, and the like in an efficient and speedy manner, especially when compared to that same work on a CPU. On the other hand, while GPUs excel in processing floating point operations and manipulating large amounts of memory, CPUs can be effectively and efficiently directed to identifying the information and/or data that one or more GPUs should process.

Also shown in the exemplary computing system 600 is an executable model trainer component 634 and a body of training data 636. As discussed above, and according to aspects of the disclosed subject matter, the model trainer 634 is configured to efficiently and accurately train a deep neural network/machine learning model using an iterative process.

The system 600 may also include or be connected with one or more data stores 621. Data stores may maintain any of a variety of information including, but not limited to user profiles, country vectors, domain scores from third parties, links to content items, associations between links to content items and country vectors, associations between content items and country vectors, etc.

Figure 7:
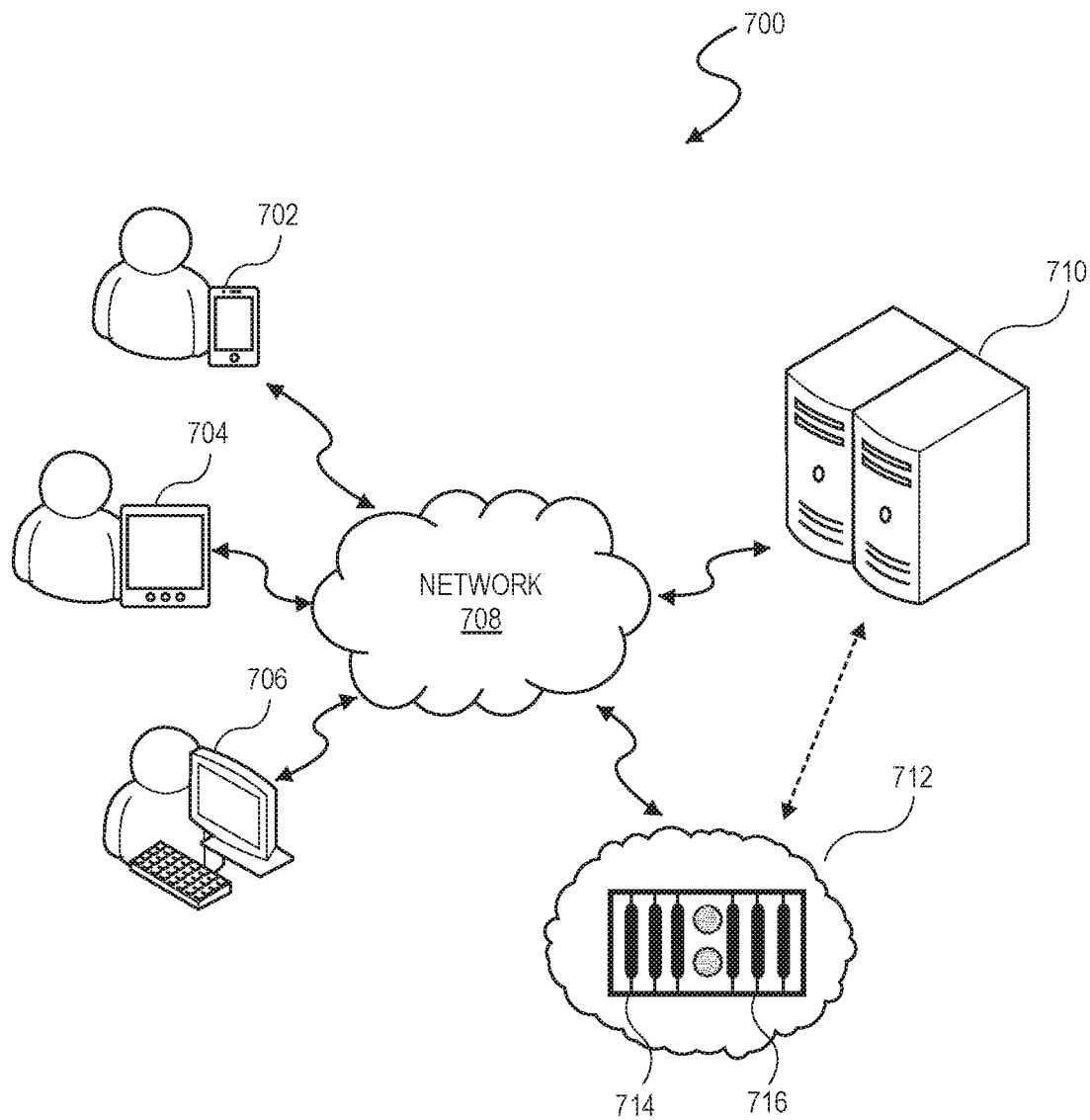
FIG. 7 is a block diagram illustrating an exemplary network environment 700 suitable for implementing aspects of the disclosed subject matter.

FIG. 7 is a block diagram illustrating an exemplary network environment 700 suitable for implementing aspects of the disclosed subject matter. In particular, the network environment includes one or more computer users operating via computing devices, such as computing devices 702-706, for connecting over a network 708 with other online services, such as country vector system 710. As will be appreciated by those skilled in the art, the user computers may comprise any of a variety of computing devices such as, by way of illustration and not limitation, tablet computers (such as tablet computer 704), laptop computers, desktop computers (such as desktop computer 706), smart phones (such as smart phone 702), and the like.

The user computers 702-706 communicate with other computers and/or devices over one or more networks, such as network 708. As will be appreciated by those skilled in the art, the network 708 is a telecommunication network over which computing devices and network enabled processes and/or services may communicate and/or exchange data. By way of illustration, a computer network such as network 708 may comprise any of a local area network or LAN, a wide area network or WAN, or combinations of the two. According to various implementations of the disclosed subject matter, the network 708 may comprise the Internet. As those skilled in the art will appreciate, the Internet is a global system of interconnected computer networks that use a defined protocol suite to link devices (including computers) worldwide. Additionally, the Internet is a network of networks that consists of private, public, academic, business, and government networks of varying scope and size, linked by a broad array of electronic, wireless, and optical networking technologies. According to aspects of the disclosed subject matter, the personal computing devices, including user computing devices 702-706, can communicate with the network 708 by way of a wired connection, a wireless connection, an optical connection, or any combination of these.

Also included in the exemplary network environment 700 is an online country vector system 710 on a network computing system. As described above, the country vector system 710 is configured to receive a request from a computer over the network 708 and, in response, determine country specific content items responsive to the request.

As illustrated in the exemplary network environment 700, and in accordance with aspects of the disclosed subject matter, the country vector system 710 may utilize local, tightly coupled, and/or remote cloud-based GPU clusters, such as cloud-based GPU cluster 712 that comprises one or more GPUs, such as GPUs 714 and 716. The GPU cluster 712 may be implemented and maintained by the country vector system 710. Alternatively, and as shown in the exemplary network environment 700, the GPU cluster 712 may be implemented as an online service accessible to the country vector system 710.

With regard to the processing by the GPU cluster 712, and many other processes, it should be appreciated that the operations of these processes are often conducted in an offline, batch mode. Indeed, processing items through a GPU-cluster (e.g., configured to implement MapReduce functionality) are made in an offline manner to produce a data set of pre-processed content that can be used by the country vector service 710 to compute country vectors.

Although the disclosure has been described herein using exemplary techniques, components, and/or processes for implementing the systems and methods of the present disclosure, it should be understood by those skilled in the art that other techniques, components, and/or processes or other combinations and sequences of the techniques, components, and/or processes described herein may be used or performed that achieve the same function(s) and/or result(s) described herein and which are included within the scope of the present disclosure.

It should be understood that, unless otherwise explicitly or implicitly indicated herein, any of the features, characteristics, alternatives or modifications described regarding a particular implementation herein may also be applied, used, or incorporated with any other implementation described herein, and that the drawings and detailed description of the present disclosure are intended to cover all modifications, equivalents and alternatives to the various implementations as defined by the appended claims. Moreover, with respect to the one or more methods or processes of the present disclosure described herein, including but not limited to the processes represented in the flow chart of FIG. 4, orders in which such methods or processes are presented are not intended to be construed as any limitation on the claimed implementations, and any number of the method or process steps or boxes described herein can be combined in any order and/or in parallel to implement the methods or processes described herein. Also, the drawings herein are not drawn to scale.

Conditional language, such as, among others, "can," "could," "might," or "may," unless specifically stated otherwise, or otherwise understood within the context as used, is generally intended to convey in a permissive manner that certain implementations could include, or have the potential to include, but do not mandate or require, certain features, elements and/or steps. In a similar manner, terms such as "include," "including" and "includes" are generally intended to mean "including, but not limited to." Thus, such conditional language is not generally intended to imply that features, elements and/or steps are in any way required for one or more implementations or that one or more implementations necessarily include logic for deciding, with or without user input or prompting, whether these features, elements and/or steps are included or are to be performed in any particular implementation.

Disjunctive language such as the phrase "at least one of X, Y, or Z," or "at least one of X, Y and Z," unless specifically stated otherwise, is otherwise understood with the context as used in general to present that an item, term, etc., may be either X, Y, or Z, or any combination thereof (e.g., X, Y, and/or Z). Thus, such disjunctive language is not generally intended to, and should not, imply that certain implementations require at least one of X, at least one of Y, or at least one of Z to each be present.

Unless otherwise explicitly stated, articles such as "a" or "an" should generally be interpreted to include one or more described items. Accordingly, phrases such as "a device configured to" are intended to include one or more recited devices. Such one or more recited devices can also be collectively configured to carry out the stated recitations. For example, "a processor configured to carry out recitations A, B and C" can include a first processor configured to carry out recitation A working in conjunction with a second processor configured to carry out recitations B and C.

Language of degree used herein, such as the terms "about," "approximately," "generally." "nearly" or "substantially" as used herein, represent a value, amount, or characteristic close to the stated value, amount, or characteristic that still performs a desired function or achieves a desired result. For example, the terms "about," "approximately," "generally," "nearly" or "substantially" may refer to an amount that is within less than 10% of, within less than 5% of, within less than 1% of, within less than 0.1% of, and within less than 0.01% of the stated amount.

Although the invention has been described and illustrated with respect to illustrative implementations thereof, the foregoing and various other additions and omissions may be made therein and thereto without departing from the spirit and scope of the present disclosure.

What is claimed is:

1. A method comprising:
   receiving a request for content items;
   determining, based at least in part on the request, a plurality of candidate content items responsive to the request;
   determining a country corresponding to at least one of the request, a device from which the request was received, or a user, wherein the determination of the country is made independent of any of the plurality of candidate content items;
   for each of the plurality of candidate content items:
      computing a country vector indicative of a relevance of the candidate content item to the country;
      determining if the country vector exceeds a threshold; and
      in response to determining that the country vector exceeds the threshold, including a link to the corresponding candidate content item in a country candidate results list; and
   returning at least a portion of the links included in the country candidate results list as responsive to the request.

2. The method of claim 1, further comprising:
   in response to determining that the country vector does not exceed the threshold, discarding the candidate content item.

3. The method of claim 1, further comprising:
   ranking the links of corresponding candidate content items based at least in part on one or more of a relevance to the request or the country vector corresponding to each content item.

4. The method of claim 1, wherein determining a country includes, determining at least one of a language corresponding to the request, a location of the device, a location of the user, or a user country preference.

5. The method of claim 1, wherein computing the country vector includes at least one of:
   determining a language corresponding to the content item;
   determining a historical user preference corresponding to a historical access by other users to the content item; or
   determining a link locale corresponding to a link of the content item.

6. A computing system, comprising:
   one or more processors; and
   a memory storing program instructions that when executed by the one or more processors cause the one or more processors to at least:
   receive a request;
   determine a location corresponding to the request;
   for each of a plurality of content items:
      compute a vector indicative of a relevance of the content item to the location;
      determine if the vector exceeds a threshold; and
      in response to a determination that the vector exceeds the threshold, include a link to the corresponding content item in a results list; and
   return at least a portion of the links included in the results list as responsive to the request;
   wherein the determination of the location is made independent of any of the plurality of content items.

7. The computing system of claim 6, wherein the location is a country from which the request originated.

8. The computing system of claim 6, wherein the program instructions, when executed by the one or more processors further cause the one or more processors to determine at least one of:
   a language corresponding to a content item of the plurality of content items;
   a historical user preference of the content item;
   a link locale for the content item; or
   third party data corresponding to the content item.

9. The computing system of claim 8, wherein the program instructions, when executed by the one or more processors to cause the one or more processors to compute the vector, further cause the one or more processors to at least:
   compute the vector based at least in part on one or more of the language, the historical user preference, or the link locale.

10. The computing system of claim 6, wherein the computation of the vector is performed at least in part by a machine learning system.

11. The computing system of claim 6, wherein the program instructions, when executed by the one or more processors further cause the one or more processors to at least:
   determine a plurality of locations corresponding to the request; and
   for each of the plurality of content items:
      compute, for each of the plurality of locations, a vector indicative of a relevance of the content item to the location.

12. The computing system of claim 11, wherein the program instructions, when executed by the one or more processors further cause the one or more processors to at least, for each of the plurality of content items:
   determine if at least one of the plurality of vectors exceeds a threshold; and
   in response to a determination that at least one of the plurality of vectors exceeds the threshold, include the link to the corresponding content item in the results list.

13. The computing system of claim 6, wherein the program instructions, when executed by the one or more processors further cause the one or more processors to at least:
   in response to a determination that the vector does not exceed the threshold, discard the corresponding content item.

14. The computing system of claim 6, wherein the program instructions, when executed by the one or more processors further cause the one or more processors to at least:
 rank the links of the content items based at least in part on one or more of a relevance to the request or the vector corresponding to each content item.

15. The computing system of claim 6, wherein the program instructions, when executed by the one or more processors further cause the one or more processors to at least:
 maintain, in a data store, the vectors computed for each of the content items.

16. A computer-implemented method, comprising:
 receiving a request for content items from a user;
 determining a country corresponding to the request from the user;
 for each of a first plurality of content items, computing at least one country vector, the country vector indicative of a relevance of the content item to the country;
 determining from the first plurality of content items, a second plurality of content items having a country vector value that exceeds a threshold, wherein the second plurality of content items is less than the first plurality of content items; and
 providing access to at least a portion of the second plurality of content items to the user;
 wherein the determination of the country is made independent of any of the plurality of candidate content items.

17. The computer-implemented method of claim 16, further comprising:
 determining the first plurality of content items as content items potentially responsive to the request; and
 determining, based at least in part on the request, the country, wherein the country vector corresponds to the country.

18. The computer-implemented method of claim 16, wherein the country is determined based on one or more of a language corresponding to the request, a location of a device from which the request was received, a location of the user, or a user country preference of the user.

19. The computer-implemented method of claim 16, wherein computing at least one country vector includes:
 determining, for the content item, at least one of a language of the content item, a language of a link to the content item, a historical user preference corresponding to the content item, a link locale for the content item, or third party data corresponding to the content item;
 providing, as input to a machine learning system, at least one of the language of the content item, the language of the link to the content item, the historical user preference corresponding to the content item, the link locale for the content item, or the third party data corresponding to the content item; and
 receiving, from the machine learning system and in response to the input, the at least one country vector for the content item.

20. The computer-implemented method of claim 16, further comprising:
 ranking the at least a portion of the second plurality of content items; and
 wherein providing access includes providing, for presentation to the user, the ranked list.

* * * * *